US009491198B2

(12) United States Patent
Gomez et al.

(10) Patent No.: US 9,491,198 B2
(45) Date of Patent: Nov. 8, 2016

(54) OBLIGATION ENFORCEMENT FOR RESOURCE ACCESS CONTROL

(71) Applicants: Laurent Gomez, Le Cannet (FR); Slim Trabelsi, Nice (FR)

(72) Inventors: Laurent Gomez, Le Cannet (FR); Slim Trabelsi, Nice (FR)

(73) Assignee: SAP SE, Walldorf (DE)

( * ) Notice: Subject to any disclaimer, the term of this patent is extended or adjusted under 35 U.S.C. 154(b) by 133 days.

(21) Appl. No.: 14/328,505

(22) Filed: Jul. 10, 2014

(65) Prior Publication Data

US 2016/0014157 A1 Jan. 14, 2016

(51) Int. Cl.
*H04L 29/06* (2006.01)

(52) U.S. Cl.
CPC ........... *H04L 63/20* (2013.01); *H04L 63/0263* (2013.01); *H04L 63/10* (2013.01)

(58) Field of Classification Search
None
See application file for complete search history.

(56) References Cited

U.S. PATENT DOCUMENTS

2005/0228685 A1* 10/2005 Schuster ............ G06Q 10/0639 705/317
2006/0004667 A1* 1/2006 Neil ...................... G06F 21/126 705/59
2006/0143464 A1* 6/2006 Ananthanarayanan G06F 21/6218 713/182
2007/0185814 A1* 8/2007 Boccon-Gibod ....... G06F 21/10 705/51
2008/0134176 A1* 6/2008 Fitzgerald ........... G06F 9/45537 718/1
2008/0137593 A1* 6/2008 Laudermilch ......... H04W 48/02 370/328
2009/0205018 A1* 8/2009 Ferraiolo ............ G06F 21/6218 726/1
2009/0228984 A1* 9/2009 Sterin ................... G06F 21/105 726/26
2009/0249329 A1* 10/2009 Dash ......................... G06F 8/61 718/1
2010/0005505 A1* 1/2010 Gottimukkala ....... H04L 41/082 726/1
2010/0112983 A1* 5/2010 Walker ................ H04L 41/0806 455/411
2010/0115581 A1* 5/2010 Goldschlag ......... H04L 41/0806 726/1
2010/0115582 A1* 5/2010 Sapp ................... H04L 41/0806 726/1
2011/0302400 A1* 12/2011 Maino ................... G06F 21/575 713/2
2012/0096525 A1* 4/2012 Bolgert ............... G06F 11/3065 726/6
2013/0047265 A1* 2/2013 Radhakrishnan ..... H04L 63/105 726/28
2013/0047266 A1* 2/2013 Radhakrishnan ... H04L 63/0807 726/28
2013/0332984 A1* 12/2013 Sastry ..................... G06F 21/30 726/1
2013/0332985 A1* 12/2013 Sastry ..................... G06F 21/30 726/1
2014/0257893 A1* 9/2014 Nicol .................. G06Q 10/087 705/7.13

OTHER PUBLICATIONS

Hilty, M. et al., "Monitors for Usage Control", in IFIP International Conference on Trust Management (pp. 411-414), Springer US, 2007.*

Hilty, M. et al., "A Policy Language for Distributed Usage Control", in European Symposium on Research in Computer Security (pp. 531-546), Springer Berlin Heidelberg, 2007.*

(Continued)

*Primary Examiner* — Andrew Nalven
*Assistant Examiner* — Christopher Ruprecht
(74) *Attorney, Agent, or Firm* — Brake Hughes Bellermann LLP

(57) ABSTRACT

A request handler may be configured to receive an enforcement request for enforcement of an obligation required as a condition for a previously-granted first resource access request. n obligation enforcer may be configured to enforce the obligation, based on the enforcement request, and a compliance manager may be configured to obtain certification of execution of the obligation from an obligation certification service, and to provide the certification as a basis for granting a second resource access request.

16 Claims, 6 Drawing Sheets

(56) References Cited

OTHER PUBLICATIONS

Bezzi, M. et al., "Data Usage Control in the Future Internet Cloud", in The Future Internet Assembly (pp. 223-231), Springer Berlin Heidelberg, 2011.*

Meriam Ben-Ghorbel-Talbi, Frederic Cuppens, Nora Cuppens-Boulahia, and Adel Bouhoula, "An Extended Role-based Access Control Model for Delegating Obligations", retrieved from http://www.rennes.enstbretagne.fr/~fcuppens/articles/dpm09.pdf, Sep. 3-4, 2009, 10 pages.

Qun Ni, Elisa Bertino, Jorge Lobo, An Obligation Model Bridging Access Control Policies and Privacy Policies, retrieved from https://www.cs.purdue.edu/homes/bertino/IIS-eHealth/oblig-h.pdf, SACMAT '08, Jun. 11-13, 2008, Estes Park, Colorado, US, 13 pages.

Slim Trabelsi, Jakub Sendor, Stefanie Reinicke, PPL: PrimeLife Privacy Policy Engine. Policy 2011: 184-185.

Public Key Infrastructure, retrieved from http://en.wikipedia.org/wiki/Public-key_cryptography#Distribution_of_a_new_key, downloaded on Jun. 15, 2014, 16 pages.

* cited by examiner

OBLIGATION ENFORCEMENT FOR RESOURCE ACCESS CONTROL

TECHNICAL FIELD

This description relates to resource access control.

BACKGROUND

Access to computing and network resources is often governed by corresponding access control rules or policies. Such resources might include, for example, data stored locally or remotely, processing and memory/storage resources, software applications (services), or virtually any other functional or non-functional asset that may be provided in the context of a particular computing/network platform. Meanwhile, the access control rules or policies generally specify conditions that must be fulfilled by a subject (e.g., a user, service, machine, or client) in order to access one or more such resources. Once granted access, the subject may be authorized to perform one or more actions in conjunction with the access resource, such as, for example, reading or modifying data, requesting a particular service or function to be performed, or generally utilizing features of the granted resource.

In some cases, some such actions may be required by corresponding access control rules or policies, as a post-grant condition for granting access to the corresponding resource. Such actions that are required to be executed after, or in conjunction with, the granting of access, as a condition of the granted access, may also be referred to as obligations. For example, access to a data file may be conditioned upon an obligation on the part of the subject user to delete the data file after a certain amount of time, or a certain number of accesses. In other examples, restrictions may be placed on sharing access to the granted resource, or, conversely, requirements may be made with respect to sharing access to the granted resource with specific other users, or with a certain number of other users.

In addition to the few examples of such obligations just mentioned, many other types of obligations exist and may be implemented in the context of particular access control systems, as desired by an administrator or other provider of such access control systems. Nonetheless, it may be difficult to ensure or enforce compliance with such obligations, because, e.g., actions taken by a subject who has been granted resource access are often not subject to control by the administrator or other provider of the access control system. As a result, it may not be known whether a particular obligation has actually been fulfilled, and, in particular, it may be difficult or impossible to base future resource access decisions on a fulfillment (or non-fulfillment) of previous obligations.

SUMMARY

Using the techniques described herein, when access to a document or other network resource is granted in conjunction with an obligation to take (or not to take) some action, the obligation may be tracked and enforced. Thus, in response to a subsequent access request for access to the same or different network resource, previous compliance (or non-compliance) with the obligation may be considered as a factor in whether or not to grant the subsequent access request.

According to one general aspect, a system may include instructions recorded on a non-transitory computer-readable medium, and executable by at least one processor. The system may include a request handler configured to cause the at least one processor to receive an enforcement request for enforcement of an obligation required as a condition for a previously-granted first resource access request. The system may include an obligation enforcer configured to cause the at least one processor to enforce the obligation, based on the enforcement request, and a compliance manager configured to cause the at least one processor to obtain certification of execution of the obligation from an obligation certification service, and to provide the certification as a basis for granting a second resource access request.

According to another general aspect, a computer-implemented method for executing instructions stored on a non-transitory computer readable storage medium may include providing, by at least one processor, an enforcement request for enforcement of an obligation required as a condition for a previously-granted first resource access request. The method also may include obtaining, by at least one processor, certification of execution of the obligation from an obligation certification service, and executing, by at least one processor, an access control decision with respect to a second resource access request, based on the certification.

According to another general aspect, a computer program product may be tangibly embodied on a non-transitory computer-readable storage medium and may include instructions that, when executed, are configured to cause at least one processor to receive an enforcement request for enforcement of an obligation required by an access control policy as a condition for a previously-granted first resource access request for access to a first resource by at least one client system. The instructions, when executed, may be further configured to cause the at least one processor to enforce the obligation at the at least one client system, based on the enforcement request, obtain certification of execution of the obligation from a third-party obligation certification service, and provide the certification as a basis for granting a second resource access request for access to a second resource by the at least one client system, and in accordance with the access control policy.

The details of one or more implementations are set forth in the accompanying drawings and the description below. Other features will be apparent from the description and drawings, and from the claims.

DETAILED DESCRIPTION

Figure 1:
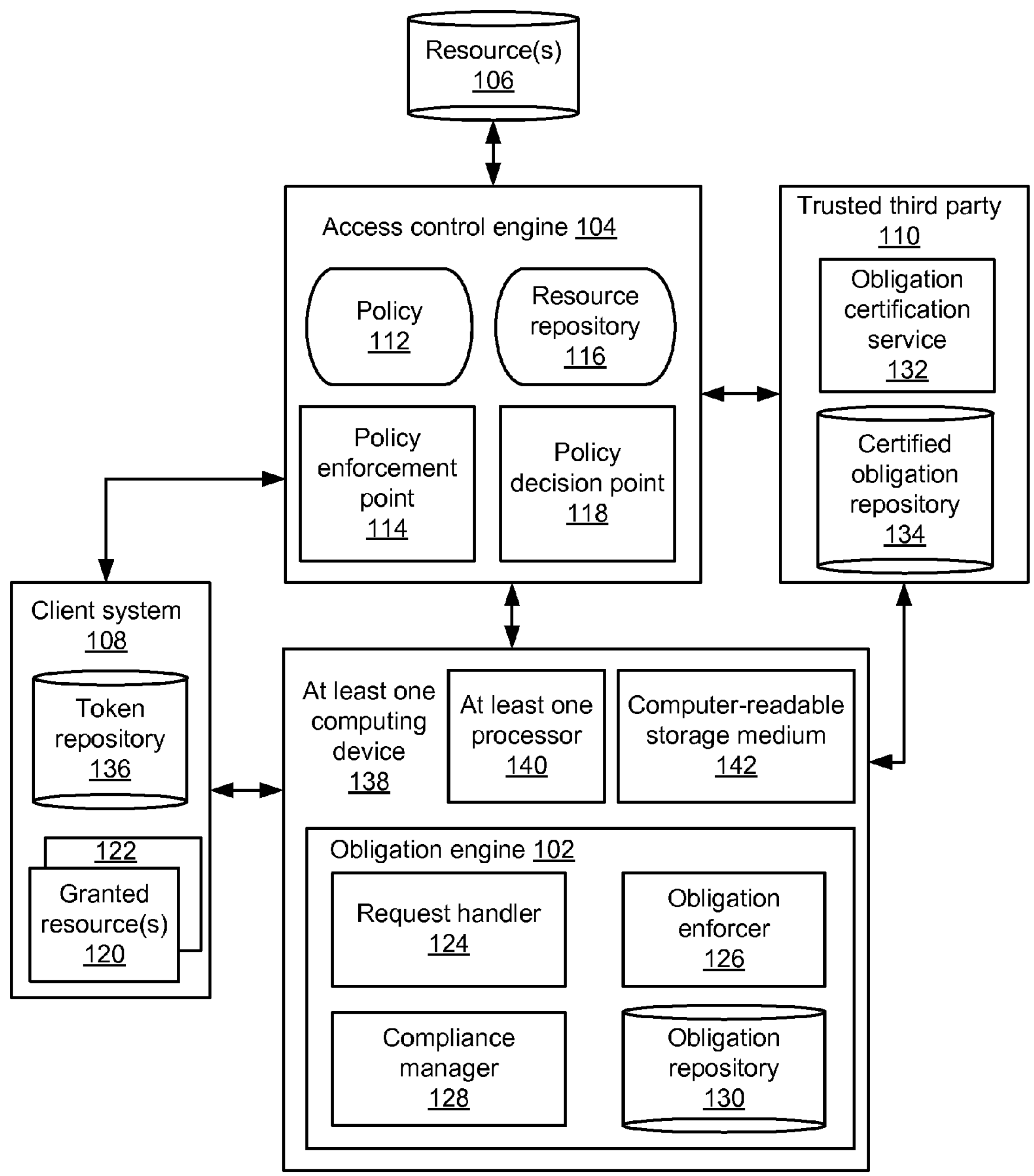
FIG. 1 is a block diagram of a system for obligation enforcement for access control.

FIG. 1 is a block diagram of a system 100 for obligation enforcement for access control. In the example of FIG. 1, an obligation engine 102 is operational to assist an access control engine 104 in determining whether access to resources 106 should be granted to a client system 108. More particularly, as described in detail below, the obligation engine 102 may be configured to ensure enforcement of an obligation specified by the access control engine 104 as a condition for access granted in response to a first resource access request. Further, the obligation engine 102 may be configured to interact with a trusted third party 110 in order to create a certification of compliance with the required obligation. In this way, a trust relationship may be established between the obligation engine 102, the access control engine 104, and the trusted third party 110. Consequently, the access control engine 104 may be provided with an assurance that a previously-required obligation has been fulfilled by the client system 108 as a condition of the first resource access request, so that the access control engine 104 may rely on such an assurance of obligation compliance when considering a second, subsequent resource access request.

In more detail, as shown, the access control engine 104 may include a policy 112 representing various access control rules, requirements, or criteria that must be fulfilled in order for the client system 108 to be granted access to one or more of the resources 106. As may be appreciated, the policy 112 may include many various conventional features, which are not necessarily described herein in detail, except as may be necessary or helpful in understanding operations of the system 100 of FIG. 1. For example, the policy 112 may specify certain username/password requirements, particular role-based security clearance levels, usage control rules, or virtually any other known technique for preserving an integrity or confidentiality that may be required with respect to particular resources of the resources 106, and/or any associated business criteria related to granting resource access (e.g., service level agreements or quality assurances).

A policy enforcement point 114 may be configured to receive resource access requests from the client system 108, and from various other client systems, not specifically illustrated in FIG. 1. Meanwhile, a resource repository 116 may be utilized to store information related to the various resources 106, such as, for example, descriptive information characterizing individual resources, as well as access information detailing manners in which individual resources may be provided. Then, a policy decision point 118 may be configured to receive resource access requests from the policy enforcement point 114, and thereafter render an access decision, based on the resource access request, the policy 112, and the resource repository 116. Once the resulting resource access decision has been reached, the policy enforcement point 114 may be responsible for granting the access and ensuring compliance therewith (e.g., may grant full access, restricted access, or may deny access).

In this regard, it may be appreciated that the access control engine 104, by itself, represents a simplified version of known or future access control engines that may be used to exercise access control with respect to the resources 106. Such access control systems may be implemented in many different contexts, as would be apparent to one of skill in the art. For example, the access control engine 104 may be implemented as a standalone component, or may be integrated within a larger resource control system, such as, for example, a network firewall designed to facilitate authorized access to a private network.

Similarly, the access control engine 104 may be understood to be implemented, in various scenarios, using local computing resources, or through remote network access. Consequently, it may be further appreciated that the inclusion of various additional or alternative modules or components within the access control engine 104 would be selected in a manner consistent with a context of a particular implementation of the access control engine 104.

For example, the access control engine 104 may be designed to grant authorized access to a predefined pool of users, such as when the access control engine 104 is implemented in the context of a business for the purpose of determining authorized access for employees of the business. In such contexts, the access control engine 104 may include, or may have access to, a database that details identities and characteristics of the employees. In other contexts, such as when the access control engine 104 is implemented in conjunction with a publicly available webpage, the access control engine 104 may be designed to grant resource access to a wider potential pool of users, including users from the public at large. Again, in these and various other circumstances, it would be expected that the access control engine 104 would be modified in any appropriate manner to ensure a desired level and type of resource access.

With the above understanding of possible implementations of the access control engine 104, it will be similarly appreciated that the various resources 106 may generally represent any available or appropriate resource that may be governed by the various implementations of the access control engine 104 just referenced. For example, a resource may represent a particular file, database, document, image, or other data that may be provided to the client system 108. For example, such data may be provided by way of download to the client system 108, and/or may be provided by way of remote (e.g., cloud-based) access.

A particular resource of the resources 106 also may represent permission to access private network features or functions, or permission to access processing or memory/storage resources that may be made available to the client system 108 (e.g., access to one or more virtual machines). Further, the resources 106 may represent or include various transactional resources, e.g., associated with conducting a web-based business transaction, including financial information (e.g., credit card information). Again, these and many other such resources should be understood to be included in, or represented by, the resources 106, and the various specific examples and use cases mentioned herein should therefore be understood to be non-limiting, and merely for the sake of example and explanation.

In this context, then, in the example of FIG. 1, it is assumed for the sake of explanation and example that they client system 108 provides a first resource access request to the access control engine 104, which results in the providing of a granted resource 120. As referenced above, and as described in detail herein, the decision to grant access to the granted resource 120 may be conditioned upon enforcement of an obligation in conjunction therewith.

As also referenced above, and as described in detail below, the obligation engine 102 may be configured to ensure the enforcement of the obligation, as well as ensuring certification of the compliance with the obligation enforcement, using the trusted third party 110. In this way, the access control engine 104 is provided with a trusted certification of compliance with the obligation, so that the access control engine 104 may rely upon such certification when deciding whether to grant access to a second granted resource 122.

In other words, it may occur that the system 108 submits a second resource access request to the access control engine 104, where the access control engine 104 determines that the second resource access request should be conditioned upon successful completion of the obligation issues in conjunction with the first resource access request associated with the granted resource 120. Due to the obligation certification provided by the obligation engine 102 by way of the trusted third party 110, the access control engine 104 may thus grant the subsequent resource access request for the granted resource 122, with the assurance that the previous obligation associated with granted access to the granted resource 120 has been fulfilled.

Of course, although the granted resources 120, 122 are illustrated as being included within the single client system 108, it will be understood that the two granted resources 120, 122 may be granted in conjunction with one or more such client systems, and/or in conjunction with one or more users. Moreover, although the granted resources 120, 122 are illustrated as being local to the client system 108, it may also occur that resource access is granted in the context of remote (e.g., cloud-based) access to appropriate ones of the resources 106.

In order to implement and provide the various features and functions described above, the obligation engine 102 may include a request handler 124 that is configured, for example, to receive an obligation enforcement request from the access control engine 104. That is, as described, the access control engine 104 may be configured to grant conditional access to a specified resource, where the conditional access specifies an obligation required of the client system 108. Then, the access control engine 104 may request that the obligation engine 102 assume responsibility for ensuring that the issued obligation is met. Consequently, in specific implementations, the request handler 124 may receive an obligation enforcement request from the access control engine 104 that specifies, e.g., the nature of the obligation be enforced, the client system 108, and any relevant information regarding the resource in question or any associated usage control rules of the policy 112.

An obligation enforcer 126 and the obligation engine 102 may thus be configured to receive the obligation enforcement request by way of the request handler 124, and thereafter may proceed with ensuring enforcement of the specified obligation. Various specific examples of such obligation enforcement are provided below. In general, such obligation enforcement may depend on a type or nature of the obligation to be enforced, the policy 112, the resource in question, and/or the client system 108.

For example, in such implementations, the obligation enforcer 126 may be able to enforce a particular obligation through monitoring of the client system 108. In some such situations, such monitoring may require permission from the client system 108 for the monitoring to occur, where such permission may be understood to be a further condition of approving the resource access request in question. In various example contexts, the obligation enforcer 126 may directly obtain obligation-relevant information from the client system 108 (i.e., may "pull" data from the client system 108), while, in other implementations, the client system 108 may be responsible for transmitting necessary obligation-relevant information to the obligation engine 102 (e.g., may be required to "push" the obligation-relevant information to the obligation engine 102). Of course, various combinations of these and related methodologies may be utilized, as well.

In operation, as described in detail below, each obligation may be associated with, e.g., may be defined in terms of, a specific trigger event, where, again, such trigger events may be reported by the client system 108, and/or may be detected by the obligation enforcer 126. For example, such trigger events may include the passage of a certain amount of time, a sending or receipt of a particular message or type of message, a copying or deletion of a particular data file, a modification of a granted resource, or virtually any other event that may be included in conjunction with an obligation defined by the usage control policies of the access control engine 104, and that are associated with defined actions that the client system 108 is required to take (or required not to take) as a condition of access to a particular resource.

A compliance manager 128 of the obligation engine 102 may be configured to interact with the obligation enforcer 126 to determine a completion or other status of a particular obligation. In this regard, as shown, an obligation repository 130 of the obligation engine 102 may be utilized to store individual, received obligations, along with relevant information, such as a description or characterization of the obligation in question and associated requirements (e.g., including specification of a specific manner in which the obligation enforcer 126 should precede with obligation enforcement), along with a current status of each obligation and its associated enforcement.

Then, by interacting with the obligation repository 130, the compliance manager 128 may determine that the obligation enforcer 126 has updated a status of a particular obligation therein to reflect successful obligation enforcement. Thereafter, the compliance manager 128 may proceed to interact with the trusted third party 110 to ensure trusted certification of the successful obligation enforcement.

More specifically, as shown, the trusted third party 110 may include an obligation certification service 132, in conjunction with a certified obligation repository 134. In operation, the compliance manager 128 generates a proof of obligation enforcement that is sent to the obligation certification service 132, whereupon the obligation certification service 132 may proceed to sign the received obligation proof, following an otherwise-conventional signature scheme.

For example, the obligation certification service 132 may be configured to implement a secure signature scheme that includes distribution of a public/private key pair among the distributed system 100 of FIG. 1. For example, in FIG. 1, the client system 108 is illustrated as including a token repository 136, which may generally represent a key store for holding one or more public/private key pairs distributed by the trusted third party 110. For example, the client system 108 may implement the token repository 136 as part of a web browser based security scheme.

Of course, although not specifically illustrated in FIG. 1, it may be appreciated that each of the obligation engine 102, the access control engine 104, and the trusted third party 110 may be configured to store respective public/private key pairs of their own. For example, the trusted third party 110 may store necessary keys or certificates within, or in conjunction with, the certified obligation repository 134. Similarly, the obligation engine 102 may utilize the obligation repository 130 to store any appropriate token, key, or other certificate, while the access control engine 104 may store such certification-related data in conjunction with the policy 112, a resource repository 116, or any appropriate data store.

Certain example details regarding techniques of the obligation certification service 132 in creating, distributing, revoking, or otherwise managing public/private key pairs or other appropriate tokens or certificates are described below. Nonetheless, it will be appreciated that such description is provided for the sake of example and explanation, and that details of various secure certification techniques that may be implemented by the obligation certification service 132, by themselves, would be known to one of skill in the art.

Regardless of the specific type of certification technique utilized by the obligation certification service 132, it may be appreciated from the example of FIG. 1 that the use of any such known or future certification technique in the context of the obligation enforcement operations of FIG. 1 provide all of the access control engine 104, the client system 108, the trusted third party 110, and the obligation engine 102 with a trust relationship. Consequently, for example, the client system 108 may be assured of secure and trusted interactions with the obligation engine 102, such as when the client system 108 is required to delegate some measure of access or control to the obligation enforcer 126.

For example, in such implementations, the compliance manager 128 may interact with the obligation certification service 132 at an early stage of operations of the obligation enforcer 126, in conjunction with the receipt of an obligation enforcement request from the request handler 124. That is, the compliance manager 128 may populate the token repository 136 to the client system 108 with an appropriate set of tokens, so as to ensure a trusted relationship between the obligation engine 102 and the client system 108. In this way, the same trusted relationship may be relied upon by the compliance manager 128 in providing any proof of obligation enforcement to the obligation certification service 132. Then, again, the same trusted relationship may be relied upon in communications between the trusted third party 110 and the access control engine 104, as well as between the access control engine 104 and the obligation engine 102. In this way, as described, the access control engine 104 may confidently grant a second resource access request for the granted resource 122, based on a trusted assurance that any obligation specified as a required condition for granting of a first resource access request for the granted resource 120 has been fulfilled.

In the example of FIG. 1, the obligation engine 102 is illustrated as being executed using at least one computing device 138. As further illustrated, the at least one computing device 138 may itself include at least one processor 140, as well as a non-transitory compute readable storage medium 142. That is, for example, the at least one computing device 138 may represent two or more computing devices, which may be in communication with one another. Similarly, the at least one processor may represent two or more processors, executing in parallel, while the non-transitory computer readable storage medium 142 represents any suitable storage medium that may be utilized to store data associated with the obligation engine 102, as well as instructions that, when executed by the at least one processor 140, cause the at least one computing device 138 to implement the obligation engine 102. Of course, the at least one computing device 138 may include various other hardware and software components, not specifically illustrated in the simplified example of FIG. 1, such as various peripheral components, human input/output devices, power components, or network interface components.

Although the at least one computing device 138 of FIG. 1 is illustrated as implementing the obligation engine 102 separately from, e.g., the access control engine 104 and the client system 108, it may be appreciated that this configuration is also merely for example. In other example implementations, the obligation engine 102 and the client system 108 may be implemented together using at least one computing device. Similarly, it may occur that the at least one computing device 138 is utilized to implement both the obligation engine 102 and the access control engine 104. Also, the resources 106 may be local to one or more of the access control engine 104, the obligation engine 102, or the client system 108, or may be remote from any or all of these.

In the example of FIG. 1, the obligation engine 102, the access control engine 104, the client system 108, and the trusted third party 110 are illustrated as including separate, discrete components. However, it may be appreciated that any such individual component may be implemented as two or more subcomponents, while, conversely, any two or more components of FIG. 1 may be combined for implementation as a single component, as would be appropriate for a particular implementation of the system 100 of FIG. 1.

Figure 2:
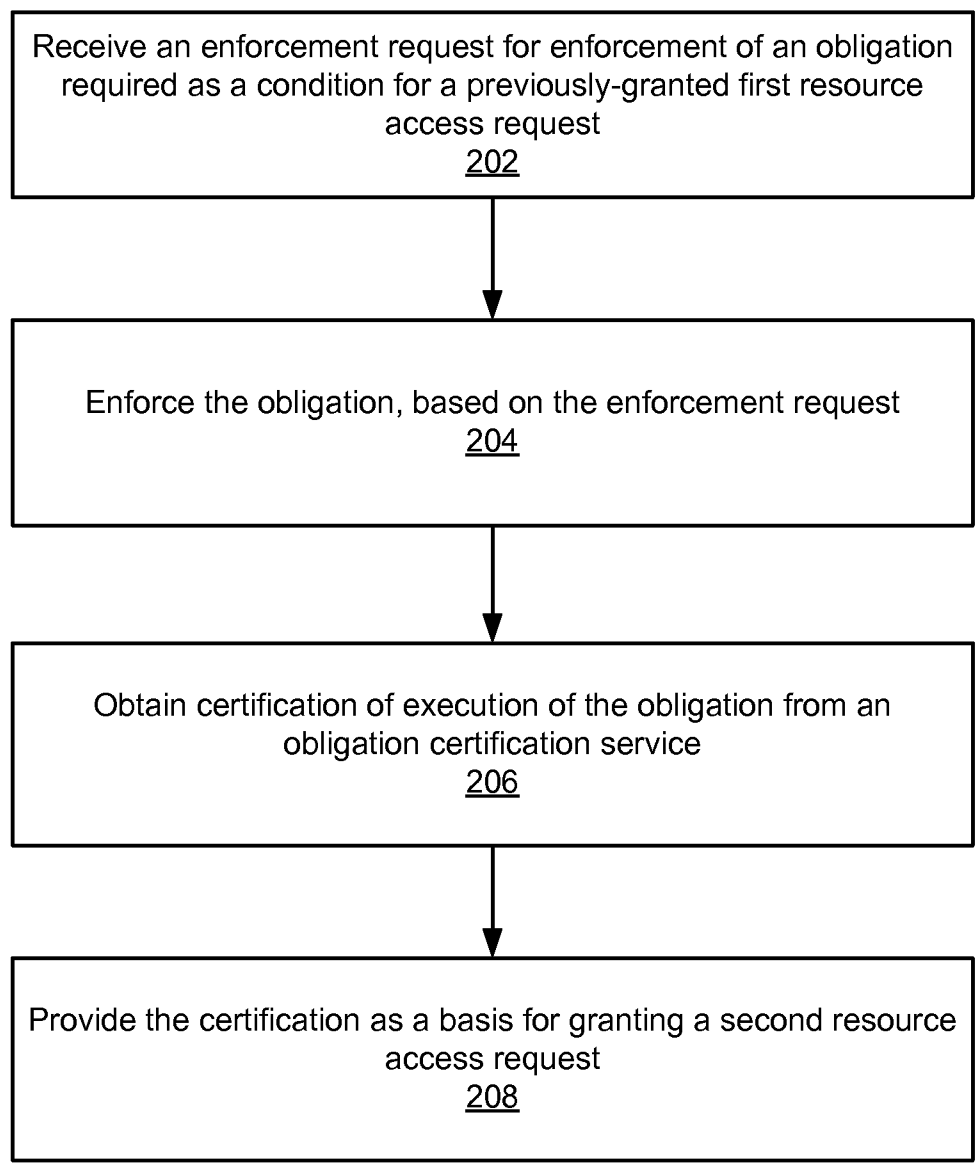
FIG. 2 is a flowchart illustrating example operations of the system of FIG. 1.

FIG. 2 is a flowchart 200 illustrating example operations of the system 100 of FIG. 1. In the example of FIG. 2, operations 202-208 are illustrated as separate, sequential operations. However, it may be appreciated that, in various implementations, any two or more of the operations 202-208 may be executed in a partially or completely overlapping or parallel manner, or in a nested, iterative, looped, or branched fashion. Further, in such implementations, additional or alternative operations may be included, and one or more operations may be omitted.

In FIG. 2, an enforcement request for enforcement of an obligation required as a condition for a previously-granted first resource access request may be received (202). For example, the request handler 124 of the obligation engine 102 may receive an enforcement request from the access control engine 104, with respect to an obligation issued to the client system 108 in conjunction with providing the first granted resource 120 thereto, and in response to a first resource access request from the client system 108.

For example, as described above, the client system 108 may transmit the first resource access request to the access control engine 104, and the policy decision point 118 of the access control engine 104 may determine, based upon the policy 112, that the client system 108 is entitled to receive certain access to the granted resource 120 of the resources 106, as included within the resource repository 116. In this context, the policy decision point 118 may determine that the policy 112 specifies at least one associated obligation upon the client system 108 to be issued in conjunction with the granting of the access to the granted resource 120.

For example, the granted resource 120 may include a file, and the issued obligation may include a requirement to delete the file after a certain amount of time has passed, or a requirement not to share the file with an untrusted party. Then, the access control engine 104, e.g., the policy enforcement point 114, may transmit the obligation enforcement request to the request handler 124 of the obligation engine 102, to thereby delegate enforcement of the obligation to the obligation engine 102. In alternative implementations, the client system 108 may have partial or complete responsibility for interacting with the obligation engine 102 in order to delegate authority to the obligation engine 102 for ensuring compliance with the obligation in question. In some implementations, at this point in the process, it may occur that some or all of the obligation engine 102, the access control engine 104, the client system 108, and the trusted third party 110 have established a trust relationship, so that the obligation enforcement request may be verified as originating from a trusted source. In other implementations, the trust relationship may be formalized at a later stage, e.g., in conjunction with certification of obligation compliance having occurred. In some implementations, the obligation engine 102, the access control engine 104, and the obligation certification service 132 may authenticate with one another using a separate authentication scheme, e.g., using a conventionally-implemented username/password or other credential-based authentication technique.

The obligation may be enforced, based on the enforcement request (204). For example, the obligation enforcer 126 of the obligation engine 102 may be configured to enforce the completion of the obligation by the client system 108. As referenced above, and as described in detail below, an ability of the obligation enforcer 126 to ensure enforcement of the obligation by the client system 108 may require varying levels of access of the obligation enforcer 126 to the client system 108, depending on a type and nature of the obligation, and/or on a manner in which enforcement occurs. For example, the obligation enforcer 126 may be granted access to a system log of the client system 108, in order to ensure that required actions associated with the obligation in question have been taken.

Certification of execution of the obligation may be obtained from an obligation certification service (206). For example, the compliance manager 128 of the obligation engine 102 may consult the obligation repository 130 to determine that a current status of the obligation in question has been updated by the obligation enforcer 126 to reflect successful enforcement of the obligation. Then, the compliance manager 128 may communicate with the obligation certification service 132 of the trusted third party 110, in order to request certified proof of the successful enforcement of the obligation thereby, for storage thereof within the certified obligation repository 134 of the trusted third party 110.

The certification may then be provided as a basis for granting the second resource access request (208). For example, the compliance manager 128 may directly provide the obligation certification, as stored within the certified obligation repository 134, to the access control engine 104. In other implementations, the compliance manager 128 may provide the obligation enforcement certification indirectly, by instructing the trusted third party 110 to make the certified proof of obligation enforcement available to the access control engine 104. In still other implementations, the obligation engine 102 may allow the client system 108, using the token repository 136, to be responsible for providing the certified proof of obligation enforcement to the access control engine 104.

When, as described, upon submission of a second resource access request by the client system 108 to the access control engine 104, the access control engine 104 (e.g., the policy decision point 118) may be provided with an ability to verify the previous execution of the obligation issued in conjunction with the granting of access to the first granted resource 120. Thus, the access control engine 104 may rely upon this proof of successful obligation execution when acting upon the second resource access request received from the client system 108, and may grant access to the second granted resource 122 in conjunction therewith.

FIGS. 3-6 provide additional detail with respect to various example implementations of the system 100 of FIG. 1, and thus represent, for example, examples of the types of additional or alternative operations referenced above and contemplated with respect to the flowchart 200 of FIG. 2. Specifically, as may be appreciated from the above discussion of FIGS. 1 and 2, FIGS. 3-6 may represent operations associated with stateful access control systems, in which current access requests are judged at least in part in relation to previous access requests. Such stateful access control systems may be contrasted with stateless access control systems, which generally consider only a current state for making access control decisions. Stateful access control systems may be particularly useful, for example, in environments in which access and uses control rules are required to comply with applicable security and privacy regulations and laws.

Thus, FIGS. 3-6 may be understood to represent and describe operations of associated access control systems in which obligation-based access control is implemented as a way to foster execution of obligations, even in scenarios in which the access control engine 104 may not have any direct influence or control upon the subject (e.g., the client system 108) to whom resource access is being granted. Nonetheless, as described, the access control engine 104 may be enabled to place a burden of proof with respect to establishing proper execution of issued obligations upon the relevant subject (e.g., the client system 108). The subject may then utilize the obligation engine 102, in conjunction with the trusted third party 110, to ensure both actual enforcement of the obligation, as well as a subsequent, trusted certification proving the enforcement of the obligation.

Figure 3:
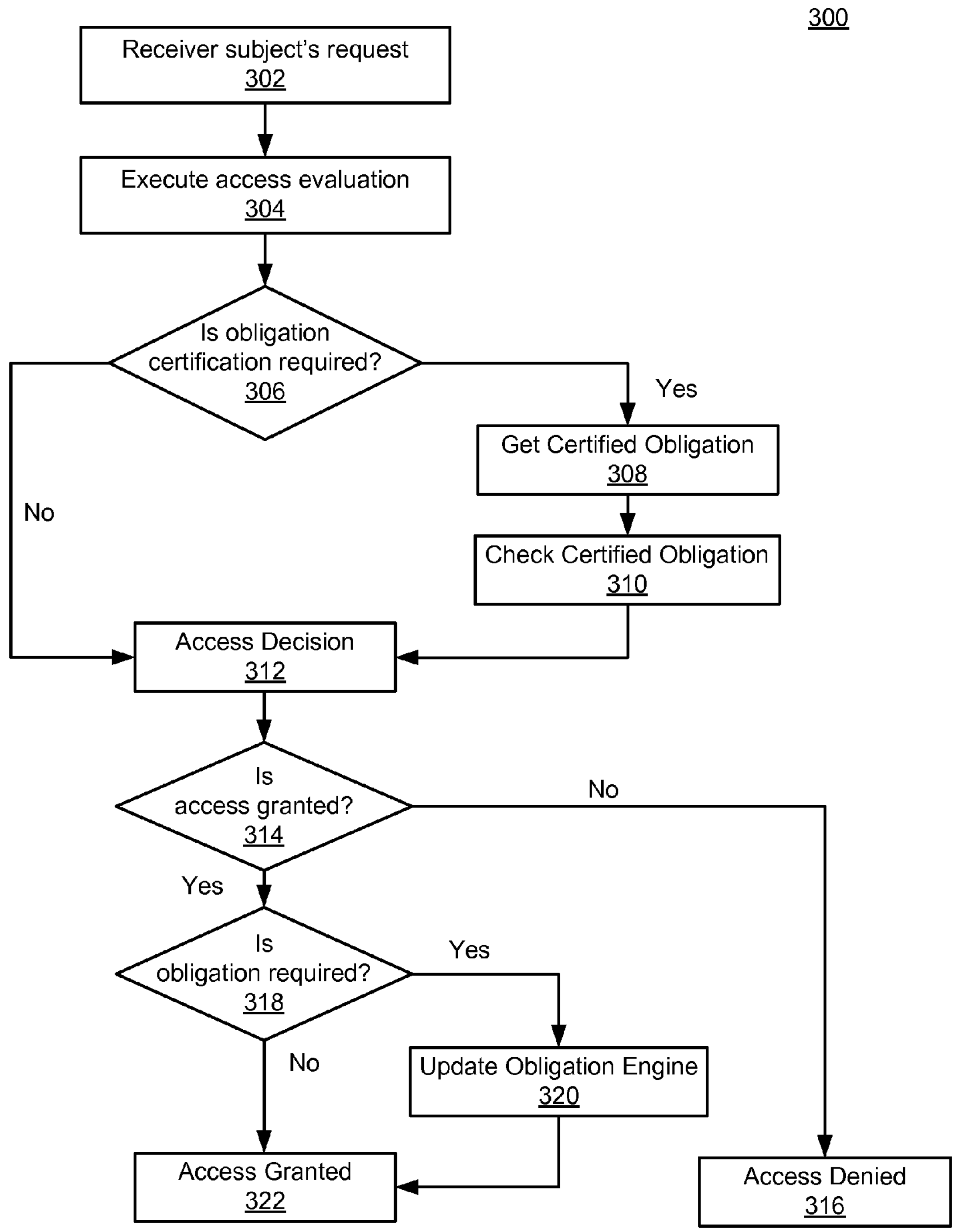
FIG. 3 is a more detailed example flowchart illustrating operations related to obligation-based access control decisions.

FIG. 3 is a flowchart 300 illustrating more detailed example operations related to obligation based access control. In the example of FIG. 3, as illustrated, a subject resource access request may be received (302), such as when the policy enforcement point 114 receives a first resource access request from the client system 108 for the resource 120 of the resources 106.

Corresponding access evaluation for the first resource access request may be executed by the access control engine 104, e.g., by the policy decision point 118 (304). For example, the policy decision point 118 may match the received resource access request with a corresponding portion of the security policy 112.

Next, a requirement for obligation certification, if any, may be determined (306). In the simplified example, it may occur that the first resource access request associated with the resource 120 to be granted may be an initial resource access request, so that no previous obligation has been issued. More generally, in any scenario in which no certification of previous obligation execution is required in conjunction with a current access control decision being made is required (306), an access decision (312) may be made immediately, based only on the applicable portions of the policy 112.

If the result of the access decision is that access is not granted (314), then access may be denied (316). On the other hand, if access is granted (314), then a determination may be made as to whether an obligation is required to be executed as a condition of the granted access (318).

If no such obligation is required (318), then access may be immediately granted (322). On the other hand, if at least one obligation is required as a condition for granted access (318), then the obligation engine 102 may be updated accordingly (320) before access is ultimately granted (322).

Details associated with example operations for updating the obligation engine 102 in the context of the operation 320 are described above, and further examples thereof are provided below with respect to FIGS. 4 and 5. In general, however, it may be understood that further operations associated with the operation 320 may include any and all operations for, e.g., delegating authority to the obligation engine 102 to enable obligation enforcement, execute obligation enforcement, and ultimately certify compliance with the obligation, through the use of the trusted third party 110.

During a subsequent iteration of the flowchart 300 of FIG. 3, a second resource access request may be received from subjects (302), and a corresponding access evaluation may be executed in conjunction therewith (304), e.g., in conjunction with requested access to the resource 122 of the resources 106. In this case, as just described, it is presumed that the previous granting of access to the granted resource 120 was conditioned upon proof of execution of one or more obligations, so that the determination of whether an obligation certification is required (306) is answered in the affirmative. Then, the certified obligation may be obtained (308), and verified (310). For example, the access control engine 104 may retrieve the relevant obligation certification from the certified obligation repository 134, by way of the obligation certification service 132.

Based on the certified obligation, and other relevant aspects of the policy 112, an access decision (312) may proceed. As already described, if any such aspect of the policy 112 indicates that access should not be granted (314), then access may be denied (316). Otherwise, access is granted (314), and a further determination as to whether a second obligation, associated with the current, second resource access request, is required (318). In other words, such a second obligation should be understood to represent another example of an obligation to be enforced (and certified as such) before granting access in the future to a third granted resource. That is, if such a second obligation is required, then the obligation engine 102 may be updated accordingly (320), so that the ultimate enforcement and certification of execution of the second obligation may be used later as a basis for evaluating a third resource access request that might be received in a third or subsequent iteration of the flowchart 300 of FIG. 3.

Finally in FIG. 3, as illustrated, if such a second obligation is not required as an access condition, then access may be granted (322). Similarly, if the second obligation is required (318), then, following appropriate updating of the obligation engine 102 (320) as described above, access may be granted (322).

Figure 4:
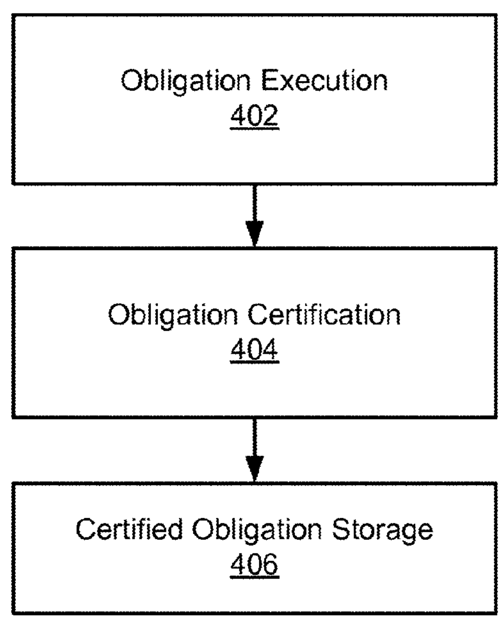
FIG. 4 is a flowchart illustrating example operations related to obligation certification.

FIG. 4 is a flowchart 400 illustrating example operations associated with obligation certification. For example, with reference to FIG. 3, it may be appreciated that the operations 402-406 of the flowchart 400 relate generally to operations associated with the updating of the obligation engine 102 described above in conjunction with the operation 320. However, it will be appreciated that portions of the flowchart 400 may not be completed until sometime after access is granted in the operation 322 of FIG. 3. For example, it may occur that the first resource access request is associated with an obligation, so that the obligation engine 102 is updated accordingly as part of the operation 320 of FIG. 3. Updating the obligation engine 102 to ensure current or future enforcement of the related obligation may be sufficient to permit proceeding to the granting of access in the operation 322, even though actual execution and certification of the obligation may not occur until sometime after the granting of the access.

For example, as referenced above, the obligation may include an obligation to delete a particular file included within the granted resource 120. The obligation may be associated with, for example, a time limit of 2 days. Then, access to the granted resource 120 may be provided immediately, so that the subject (e.g., the client system 108) may immediately begin accessing the file in question, even though, by definition, it is not possible to certify compliance with the obligation until a passage of time that is equivalent to at least 2 days. Therefore, access of the first granted resource 120 may be granted immediately, while access to the second granted resource 122 may not be granted for at least a period of 2 days, in order to verify compliance with the obligation. In other example embodiments, however, it may occur that access to the second granted resource 122 in conjunction with a second resource access request may be granted immediately (e.g., within the specified 2 day window), even though the obligation will not yet have been executed. In such scenarios, access to the second granted resource 122 may continue to be conditional upon ultimate execution and certification of enforcement of the obligation, so that, for example, if enforcement is not certified upon completion of the 2 day window, access to the second granted resource 122 may be revoked.

In the example of FIG. 4, obligation certification begins with execution of the obligation in question (402). For example, as described, based on delegation of obligation enforcement to the obligation engine 102, the obligation enforcer 126 may be configured to enforce the obligation in question.

For purposes of understanding the example of FIG. 4, an obligation may be denoted as: obligation=[subject, trigger, action]. Thus, an obligation may be understood to be an action that a subject is required to take after an event defined as a trigger. For example, in the examples just referenced, the resource may be a file or other data, and the obligation may be to delete the data after 2 days, where such obligation is based upon the subject (e.g., the client system 108), but may be delegated for enforcement thereof to the obligation enforcer 126.

In the above equation, the trigger may be based on detected events. For example, such a trigger event may be temporal (e.g., due at a specific point in time), contextual (e.g., based on a location of the subject, or on a mobile device of the subject), or any action executed on the resource (e.g., data access, modification, or deletion).

Thus, the obligation execution (402) of FIG. 4 refers generally to one or more such obligations that are pushed to the obligation engine 102 after being extracted from the access control policy 112 in response to an access control decision policy implemented by the access control engine 104. Then, the obligation enforcer 126 may monitor for any trigger event triggering the execution of the corresponding obligation within the obligation repository 130. Once such a trigger event is determined, the corresponding obligation action may be executed by the obligation enforcer 126. As described, such obligation actions may be executed directly by the obligation enforcer 126, based on permission to do so as granted by the client system 108 and/or the access control engine 104. In other implementations, the obligation action may be executed indirectly by the obligation enforcer 126, e.g., by instructing the client system 108 to perform the obligation action into report thereon.

Once obligation execution (402) has completed, obligation certification (404) may proceed. Specifically, the compliance manager 128 may determine successful obligation execution based on a current status of the obligation in question within the obligation repository 130. Then, the compliance manager 128 may proceed to provide proof of the obligation execution to the obligation certification service 132 of the trusted third party 110.

For example, the compliance manager 128 may have several available options for proving the proper execution of an obligation, and may be configured to select an appropriate one of such options, depending on a context of a particular implementation. For example, in providing a description of the obligation, the obligation execution, and a current status of the obligation execution as being completed, as determined from the obligation repository 130, the compliance manager 128 may provide evidence which supports its assertion that the obligation has been successfully executed.

Again, such evidence may vary, depending on circumstance. However, for the sake of providing specific examples, the compliance manager 128 may provide enforcement proof based on data obtained from the client system 108, such as, for example, a snapshot of a file system of the client system 108, so as to thereby establish that a particular file has or has not been deleted. In other examples, the compliance manager 128 may provide an application/operating system log. In this way, for example, the compliance manager 128 may establish that a particular file has or has not been sent by a particular email client. In other examples, the compliance manager 128 may provide certified execution code, thereby demonstrating actual execution of a particular process that is relevant to the obligation in question.

In an example nomenclature, an obligation proof may be denoted as obligation proof=[obligation, proof]. Thus, obligation in the preceding equation refers to the description of the obligation defined above with respect to the operation 402 (e.g., including subject, trigger, and action). Meanwhile, the proof in the preceding equation references appropriate evidence that the obligation in question has been properly executed.

Once such proof of obligation execution is generated by the compliance manager 128, the compliance manager 128 may transmit the proof, along with other relevant information, to the obligation certification service 132 of the trusted third party 110. The obligation certification service 132 may then be in charge of certifying and storing the proof of obligation execution, e.g., using the certified obligation repository 134.

Then, assuming the use of the type of key based signature scheme referenced above, following authentication of the obligation engine 102 and receipt of the obligation proof, the obligation certification service 132 may proceed to sign the received obligation proof, following an otherwise conventional signature scheme. As described, such a signature scheme may include distribution of one or more public/private key pairs by the obligation certification service 132. Once signed, the certified obligations may be stored within the certified obligation repository 134, as part of operations associated with certified obligation storage (406).

Figure 5:
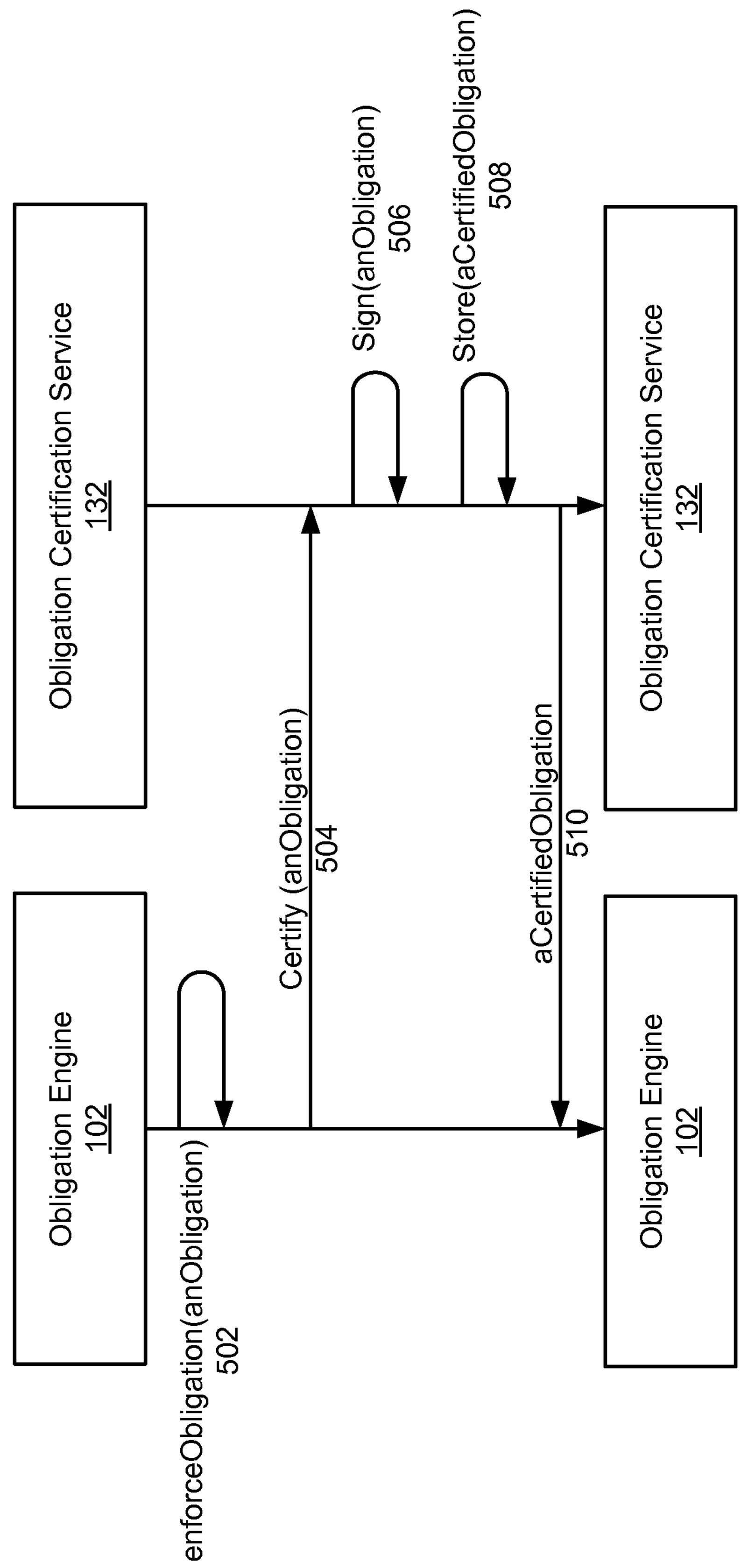
FIG. 5 is a timing diagram illustrating obligation certification procedures.

FIG. 5 is a timing diagram providing more detailed examples of messages and other operations associated with the obligation certification operation 404 of FIG. 4. In the example of FIG. 5, when an event (e.g., time, location) triggers an obligation execution, the associated action is executed by the obligation engine 102 (502). Once the obligation is executed, the obligation my send a certification request (504) for the executed obligation, along with any appropriate proof of execution, to the obligation certification service 132.

The certification request may include a request for signature by the obligation certification service (506). Then, the signed, certified obligation may be stored by the obligation certification service 132 (508), using the obligation repository 134. Finally in FIG. 5, the certified obligation may be returned (510) to the obligation engine 102. In this regard, it may be appreciated that in such implementations in which certified obligation is returned to the obligation engine 102, the certified obligation may be stored within the obligation repository 130. However, in other example implementations, it may occur that the certified obligation is provided directly to the access control engine 104, and/or to the client system 108. In still other example implementations, the certified obligation may be maintained within the certified obligation repository 134, until such time as a request for the certified obligation may be received.

Figure 6:
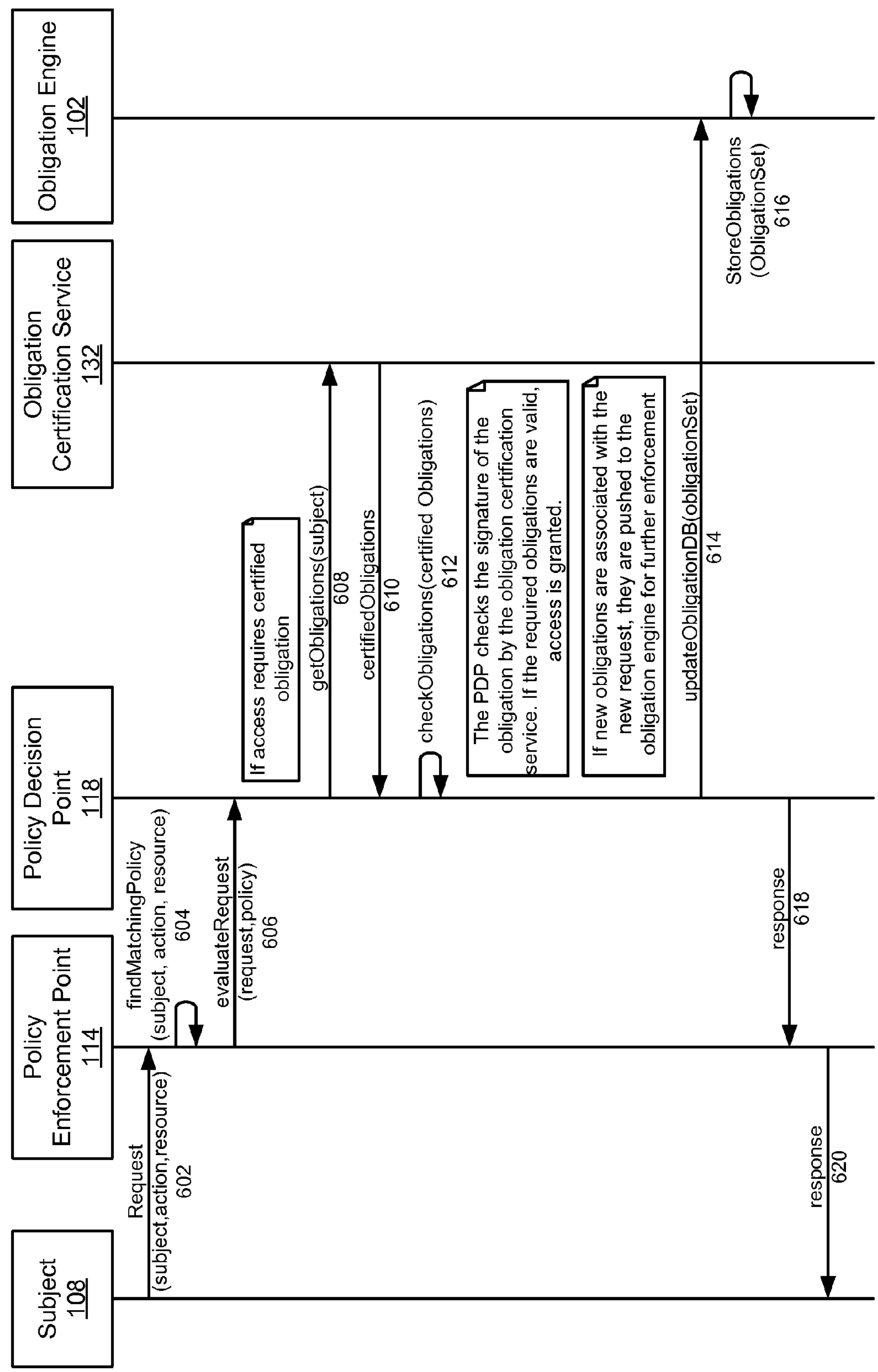
FIG. 6 is a timing diagram illustrating a security policy evaluation for obligation-based access control decisions.

FIG. 6 is a timing diagram illustrating an example of an access control policy evaluation. More specifically, FIG. 6 illustrates an example message flow, beginning from a subject's request and ending with a final response to the subject. As described, the subject may include a mobile user, an application, or a process on the mobile device.

In the example of FIG. 6, the subject's request may be composed as: request=[subject, resource, action]. As shown, the subject's request is sent from the subject (e.g., client system) 108 to the policy enforcement point 114 (602). Thereupon, the policy enforcement point 114 may proceed to evaluate the request and extract a corresponding, matching policy of the policy 112 (604).

Then, the policy enforcement point 114 may forward the request and associated policy to the policy decision point 118 (606) for an access control decision based on appropriate access control rules.

Thus, for example, a simplified policy may be represented as:

```
Policy[
Subject=any
Action=any
Resource=file2.pdf
Condition (certified obligation proof (deleted (file1.pdf)))
]
```

In other words, the preceding policy simply represents that an access control decision for access to the resource file 2.pdf (e.g., representing the second granted resource 122) to any subject and for any action, may be conditioned upon receipt of certified obligation proof that a previously accessed file (e.g., file1.pdf, representing the first granted resource 120) has been deleted.

Then, assuming that this or any appropriate obligation is required, the policy decision point 118 may query the obligation certifications service 132 (608), to thereby receive the certified obligations therefrom (610). As described, in alternative implementations, the policy decision point may also query the subject 108, or the obligation engine 102.

In any case, the policy decision point 118 may thus proceed to verify or otherwise validate the received certified obligations (612). For example, the policy decision point 118 may consider the obligation to be certified, and thus validated, if certified obligation signatures provided by the obligation certification service 132 are determined to be valid.

Assuming for the sake of example of FIG. 6 that further obligations are associated with the current request, so that certification thereof will be required as a basis for granting access in response to a subsequent resource access grant, then the policy decision point 118 may precede to notify the obligation engine 102 of the relevant obligation (614), so that the obligation repository 130 of the obligation engine 102 may be updated accordingly (616). Of course, although not specifically illustrated in FIG. 6, it may be appreciated that execution of the new obligation, certification of the execution, and storage in providing of the certification of the execution may be provided in conjunction with the subsequent resource access request, and in a manner similar to that described above (e.g., with respect to operation 602-612 of FIG. 6).

The policy decision point 118 may proceed to issue a response to the policy enforcement point 114 (618), indicating that access has been granted to the resource specified in the original subject request, and based upon fulfillment of the access control rules, including the required certification of enforcement of the relevant obligation. Then, finally in FIG. 6, the policy enforcement point 114 may precede to send a response to the subject 108 (620), providing the desired access to the granted resource requested in the original subject request.

In an example use case, the system 100 may be implemented in the context of a cloud-based file sharing service. For the sake of the example, it may be considered that the file sharing service is responsible for maintaining files, based on one or more access control policies defined by respective owners of individual files.

For example, the file owner may own data files that have been uploaded for cloud-based storage within the resources 106. The file owner, not specifically illustrated in the example of FIG. 1, may wish to share two specific files, e.g., file A and file B. The file owner may define the following policy for file A:

```
Policy {
  Subject = ANY
  Action = ANY
  Resource = FileA.pdf
  Obligation = {after 20 minutes, DeleteFile}
  Condition (None)
}
```

Meanwhile, the file owner may define the following policy for file B:

```
Policy {
  Subject = ANY
  Action = ANY
  Resource = FileB.pdf
  Condition (CertifiedObligation (FileA.pdf deleted) OR (Not access to
fileB.pdf)
}
```

As may be observed from the above policies, access to file B is restricted only to subjects that can prove that, if previously-accessed, file A has been deleted from their file system. For example, using the terminology of FIG. 1, the subjects may include the client system 108, file A may include the first granted resource 120, and file B may include the second granted resource 122. Then, as just described, the client system 108 may only be provided with access to the second granted resource (file B) if the previously-accessed granted resource 120 (e.g., file A) has been deleted from the file system of the client system 108.

As obligation proof, a system log produced by a mobile operating system of the client system 108 may be used, in which all operations on the file system are logged. Such log information, together with an obligation description, may demonstrate that the obligation enforcer 126 has, directly or indirectly, enforced deletion of the granted resource 120 (file A), so that the compliance manager 128 may provide an appropriate obligation description and the just-referenced obligation proof (e.g., system log) to the obligation certification service 132. In this way, the certified obligation may be stored within the certified obligation repository 134.

Thus, when the user of the client system 108 sends a new request for the second granted resource 122 (file B), the cloud-based file sharing service providing the access control engine 104 and the resources 106, may rely on the obligation certification provided by the trusted third party 110 in guaranteeing that the first granted resource 120 (file A) has been deleted from the mobile phone representing the client system 108 in the example use case. Assuming that such certification or deletion is available, the access control engine 104 may proceed to grant access to the second granted resource 122 (file B) to the mobile user.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system including instructions recorded on a non-transitory computer-readable medium, and executable by at least one processor, the system comprising:

a request handler configured to cause the at least one processor to receive an enforcement request for enforcement of an obligation required by an access control policy of an access control engine as a condition for a previously-granted first resource access request for access to a first network resource by a client system, the obligation mandating at least one of a requirement for, or prohibition of, at least one action by the client system, wherein the enforcement request is associated with permission to access the client system;

an obligation enforcer configured to cause the at least one processor to enforce the obligation at the client system, based on the enforcement request, and including obtaining data from the client system as proof of enforcement of the obligation associated with the at least one action through the permission to access the client system; and a compliance manager configured to cause the at least one processor to obtain the proof of the enforcement of the obligation from the obligation enforcer, provide the proof of the enforcement to a trusted third-party obligation certification service, obtain a certification of execution of the obligation from the trusted third-party obligation certification service, and provide the certification to the access control engine as a basis for granting a second resource access request for access to a second network resource by the client system, and in accordance with the access control policy.

2. The system of claim 1, wherein the request handler is further configured to cause the at least one processor to receive the enforcement request from the access control engine having authority to grant or deny the first resource access request and the second resource access request.

3. The system of claim 1, wherein the obligation enforcer is further configured to cause the at least one processor to perform, based on the permission, monitoring of the client system from which the first resource access request and the second resource access request are received, and determine that the client system has complied with the obligation, based on the monitoring.

4. The system of claim 1, wherein the obligation enforcer is further configured to cause the at least one processor to access, based on the permission, the client system from which the first resource access request and the second resource access request are received, and execute the obligation on the client system, using the access.

5. The system of claim 1, wherein the obligation enforcer is further configured to cause the at least one processor to perform, based on the permission, monitoring of the client system from which the first resource access request is received, detect a trigger event defined as triggering the obligation, and cause the action complying with and fulfilling the obligation, based on the trigger event.

6. The system of claim 1, wherein the certification is implemented using a token-based signature scheme managed by the trusted third-party obligation certification service.

7. A computer-implemented method for executing instructions stored on a non-transitory computer readable storage medium, the method comprising:

providing, by at least one processor, an enforcement request for enforcement of an obligation required by an access control policy as a condition for a previously-granted first resource access request for access to a first network resource by a client system, the obligation mandating at least one of a requirement for, or prohibition of, at least one action by the client system, wherein the enforcement request is associated with permission to access the client system;

obtaining, by the at least one processor, a certification of execution of the obligation from a trusted third-party obligation certification service, the certification based on enforcing the obligation at the client system based on the enforcement request, and obtaining data from the client system as proof of enforcement of the obligation associated with the at least one action obtained through the permission to access the client system; and executing, by the at least one processor, an access control decision with respect to a second resource access request for access to a second network resource by the client system, based on the certification and in accordance with the access control policy.

8. The method of claim 7, wherein the obtaining the certification comprises:

performing, based on the permission, monitoring of the client system from which the first resource access request and the second resource access request are received; and determining that the client system has complied with the obligation, based on the monitoring.

9. The method of claim 7, wherein the obtaining the certification comprises:

accessing, based on the permission, the client system from which the first resource access request and the second resource access request are received; and executing the obligation on the client system, using the access.

10. The method of claim 7, wherein the obtaining the certification comprises:

performing, based on the permission, monitoring of the client system from which the first resource access request is received;

detecting a trigger event defined as triggering the obligation; and causing the action complying with and fulfilling the obligation, based on the trigger event.

11. The method of claim 7, wherein the certification is implemented using a token-based signature scheme managed by the trusted third-party obligation certification service.

12. A computer program product, the computer program product being tangibly embodied on a non-transitory computer-readable storage medium and comprising instructions that, when executed, are configured to cause at least one processor to:

receive an enforcement request for enforcement of an obligation required by an access control policy as a condition for a previously-granted first resource access request for access to a first network resource by at least one client system, the obligation mandating at least one of a requirement for, or prohibition of, at least one action by the at least one client system, wherein the enforcement request is associated with permission to access the at least one client system;

enforce the obligation at the at least one client system, based on the enforcement request, and including obtaining data from the at least one client system as proof of enforcement of the obligation associated with the at least one action through the permission to access the at least one client system;

provide the proof of enforcement of the obligation to a trusted third-party obligation certification service;

obtain a certification of execution of the obligation from the trusted third-party obligation certification service; and provide the certification as a basis for granting a second resource access request for access to a second network resource by the at least one client system, and in accordance with the access control policy.

13. The computer program product of claim 12, wherein the instructions, when executed, are further configured to cause the at least one processor to:

perform, based on the permission, monitoring of the at least one client system; and determine that the client system has complied with the obligation, based on the monitoring.

14. The computer program product of claim 12, wherein the instructions, when executed, are further configured to cause the at least one processor to:

access the at least one client system, based on the permission; and execute the obligation on the client system, using the access.

15. The computer program product of claim 12, wherein the instructions, when executed, are further configured to cause the at least one processor to:

perform, based on the permission, monitoring of the at least one client system from which the first resource access request is received;

detect a trigger event defined as triggering the obligation; and cause the action complying with and fulfilling the obligation, based on the trigger event.

16. The computer program product of claim 12, wherein the certification is implemented using a token-based signature scheme managed by the trusted third-party obligation certification service.

* * * * *